United States Patent
Maxilom et al.

(10) Patent No.: US 11,232,510 B2
(45) Date of Patent: Jan. 25, 2022

(54) FRICTIONLESS INQUIRY PROCESSING

(71) Applicant: NCR Corporation, Atlanta, GA (US)

(72) Inventors: Chario Bardoquillo Maxilom, Ibabao Cordova (PH); Ferdinand Salarda Acedera, Cebu (PH); John White Go Mabute, Umapad Mandaue (PH)

(73) Assignee: NCR Corporation, Atlanta, GA (US)

( * ) Notice: Subject to any disclaimer, the term of this patent is extended or adjusted under 35 U.S.C. 154(b) by 139 days.

(21) Appl. No.: 16/368,422

(22) Filed: Mar. 28, 2019

(65) Prior Publication Data
US 2020/0311803 A1    Oct. 1, 2020

(51) Int. Cl.
*G06Q 30/00*    (2012.01)
*G06Q 30/06*    (2012.01)
*H04W 4/35*    (2018.01)
*G06Q 20/32*    (2012.01)
*G06K 9/00*    (2006.01)

(52) U.S. Cl.
CPC ..... *G06Q 30/0641* (2013.01); *G06K 9/00671* (2013.01); *G06Q 20/3223* (2013.01); *H04W 4/35* (2018.02)

(58) Field of Classification Search
CPC .. G06Q 30/0641; G06Q 20/322; G06Q 30/00; G06K 9/00671
See application file for complete search history.

(56) References Cited

U.S. PATENT DOCUMENTS

| | | | | |
|---|---|---|---|---|
| 8,913,004 B1 * | 12/2014 | Bozarth | ................. | G09G 5/006 |
| | | | | 345/156 |
| 10,438,277 B1 * | 10/2019 | Jiang | .................. | G06K 9/00664 |
| 10,552,750 B1 * | 2/2020 | Raghavan | .............. | G06N 5/048 |
| 2006/0011716 A1 * | 1/2006 | Perkowski | ............. | G06Q 30/02 |
| | | | | 235/375 |
| 2014/0267034 A1 * | 9/2014 | Krulce | .................. | G06F 1/3265 |
| | | | | 345/158 |
| 2016/0019514 A1 * | 1/2016 | Landers, Jr. | ......... | G06Q 20/202 |
| | | | | 705/20 |
| 2016/0110727 A1 * | 4/2016 | Prasad | ............... | G06Q 30/0201 |
| | | | | 705/7.29 |
| 2016/0314494 A1 * | 10/2016 | Dhawan | ............. | G06Q 30/0633 |

(Continued)

OTHER PUBLICATIONS

Raturi, Gaurav, "Virtual Mirror: the future of interaction", Hacker Noon, dated Aug. 1, 2018. (Year: 2018).*

(Continued)

*Primary Examiner* — Mark A Fadok
(74) *Attorney, Agent, or Firm* — Schwegman, Lundberg & Woessner

(57) ABSTRACT

Images capture an object that a person in a frictionless store is looking at. A user interface is automatically initiated on a device identified as the object. If the person is holding an item, the user interface is automatically placed in a state that displays the item details and pricing within the user interface and provides a link to all item descriptions in possession of the user within the frictionless store along with a running price total of all the items. If the person is not holding any item, the user interface is automatically placed in a state that displays item details and pricing within the user interface to all item descriptions in possession of the user within the frictionless store along with a running price of all items.

8 Claims, 4 Drawing Sheets

(56) References Cited

U.S. PATENT DOCUMENTS

| | | | | |
|---|---|---|---|---|
| 2018/0157336 A1* | 6/2018 | Harris | ............... | G06K 9/00288 |
| 2019/0156506 A1* | 5/2019 | Fisher | ............... | G06K 9/00771 |
| 2019/0188435 A1* | 6/2019 | Davis | ............... | G06K 9/3258 |
| 2019/0332863 A1* | 10/2019 | Abhishek | ............ | G06Q 30/0205 |
| 2020/0019970 A1* | 1/2020 | Pham | ................. | G06Q 20/322 |
| 2020/0034915 A1* | 1/2020 | Paisley | ............... | G06K 7/1417 |
| 2020/0104594 A1* | 4/2020 | Zucker | ............... | G06K 9/3233 |

OTHER PUBLICATIONS

Hwangbo et al. "Use of the Smart Store for Persuasive Marketing and Immersive Customer Experiences: A Case Study of Korean Apparel Enterprise", Hindawi.com, dated Mar. 5, 2017. (Year: 2017).*

Berlin, Johnathan, "Digitizing the Consumer Experience", Iconeme, Dated Oct. 20, 2017. (Year: 2017).*

Groopman, Jessica, "Shifting from machine logic to intelligent interfaces", Automation Technologies, dated Feb. 28, 2018. (Year: 2018).*

Lisanti, Linda, Should you embrace Frictionless checkout, Convenience store News, dated Sep. 26, 2018. (Year: 2018).*

* cited by examiner

FRICTIONLESS INQUIRY PROCESSING

BACKGROUND

Recent advancements in image processing has permitted retailers to provide a frictionless shopping experience to its consumers. In a frictionless store, an individual is allowed to check in with a store electronically, browse for items to purchase, place items in bags/carts, and exit the store without any interaction with a store agent or with a checkout station. The items that the individual possesses when leaving the store are recognized through image processing and an account associated with the individual is automatically charged for the price of the items. This allows for quick and easy shopping and is referred to as a frictionless store or frictionless shopping because the consumer does not have to interact with any agent of the store or any terminal of the store to purchase items.

However, as experience grows with frictionless stores it is apparent that often the consumers want to have some way of rapidly telling a running price total and listing of goods that the consumers have picked up while in the frictionless store and want some mechanism for identifying a price for a given item when such information is missing or not readily available from signs in the store. Scan terminals may provide a price of a given item but these terminals may experience queues of consumers trying to discover the prices of their goods and queues defeat the very purposes of a frictionless experience. Moreover, the scan terminals do not provide an interface by which the consumer can identify a current listing of the goods possessed by the consumer and a running price total for all of those goods.

Thus, there is a need for frictionless inquiry techniques that allow consumers to identify item prices and obtain running item details with pricing totals within a frictionless store.

SUMMARY

In various embodiments, methods and a system for frictionless inquiry processing are presented.

According to an embodiment, a method for frictionless inquiry processing is presented. A consumer is identified within an image as looking at a device. A user interface is caused to be automatically initiated on the device based on the consumer being identified as looking at that device. The user interface is instructed to display on the device information associated with at least one item that is in a possession of the user.

DETAILED DESCRIPTION

Figure 1:
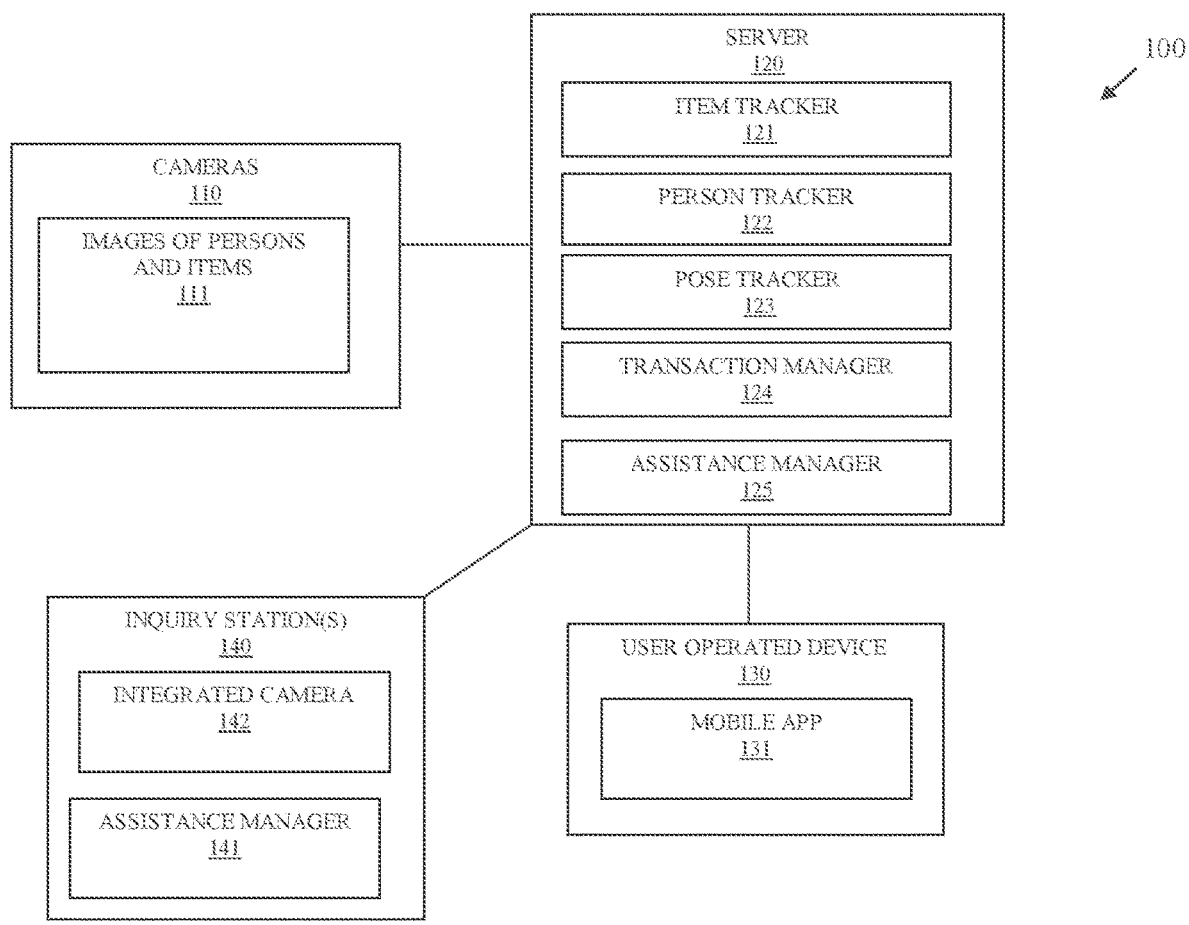
FIG. 1 is a diagram of a system for frictionless inquiry processing, according to an example embodiment.

FIG. 1 is a diagram of a system 100 for frictionless inquiry processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless inquiry processing, presented herein and below.

As used herein and below, the terms "customer," "consumer," "shopper," and "user" may be used interchangeably and synonymously.

The system 100 includes a plurality of cameras 110 that capture images of persons and items (herein after just "defined area images 111"). The system also includes a server 120, a user-operated device 130 having a mobile application ("app") 131, and one or more inquiry stations 140 having an assistance manager 141 and optionally an integrated camera 142. The server 120 includes executable instructions that execute on one or more hardware processors of the server 120 from a non-transitory computer-readable storage medium as: an item tracker 121, a person tracker 122, a pose tracker 123, a transaction manager 124, and an assistance manager 125. The user operated device 130 also includes a processor and non-transitory computer-readable media having executable instructions representing the mobile app 131. Similarly, the inquiry station 140 includes a processor and non-transitory computer-readable storage media having executable instructions representing the assistance manager 141

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. Each image 111 represents a frame in a stream of images. Multiple frames per second are captured by each of the cameras 110.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the pose tracker 123. In an embodiment, some of the images when streamed from the cameras 110 can be buffered or cached in memory of cache and made accessible from the memory or cache to the item tracker 121, the person tracker 122, and the pose tracker 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

In an embodiment, the person tracker 122 is configured for facial recognition for a unique person present in the store but does not know an actual identity for the person. That is, the person may be unregistered but still uniquely tracked through unique facial attributes assigned to the unregistered person.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc. Once enough confidence in the metadata is known for an unknown item, the item is identified and assigned item level details for a known item.

When an individual enters a frictionless store or a traditional store equipped in some areas with a frictionless store, the person tracker 122 interacts with the transaction manager 124 and assigns a transaction identifier for a transaction with the person. The person tracker 122 is responsible for tracking the person from frame to frame. The item tracker 121 identifies items and item identifiers possessed by the person when held, placed in a bag, or placed in a cart. The item identifier is provided to the transaction manager 124. The transaction manager 124 obtains the item pricing and description using the item identifier and adds the item pricing and description to the transaction associated with the assigned transaction identifier.

The pose tracker 123 utilizes the bounding box and attributes associated with the person that are produced and maintained by the person tracker 122 to identify a direction or pose of the person in any given frame. The pose tracker 123 is also trained to identify non-item objects that the person based on a given pose is believed to be looking at in each frame. The non-item objects include user-operated electronic devices 130, such as a mobile phone, a tablet, and/or a wearable processing device (such as a watch). The non-time objects can also include the inquiry stations 140 that have known physical locations within the frictionless store areas.

Furthermore, the pose tracker 123 utilizes the item tracker 121 to identify item codes that may be identified in frames associated with the person indicating that the person is holding an item.

In an embodiment, the pose tracker 123 includes a trained machine-learning algorithm that when passed a frame including a person being tracked returns an indication as to whether the person is in a pose where the person is believed to be looking at a user-operated device 130 or an inquiry station 140. If the machine-learning algorithm returns an identifier associated with an inquiry station or returns an indication that the person is looking at a user-operated device, the pose tracker 120 provides the frame to the item tracker 121, the item tracker returns an item code if the person is also holding an item and returns no item code if the person is not holding the time.

When the pose tracker 123 determines that the person is looking at a user-operated device or an inquiry station, the pose tracker provides the person tracker identifier for the person, any item code for any held item, and/or an inquiry station identifier for when the person is looking at a given inquiry station 140 to the assistance manager 125.

The assistance manager 125 interacts with the transaction manager 124 to determine if the person tracker identifier is associated with a registered and checked-in consumer of the store. When this is the case, the transaction manager returns a consumer identifier. The consumer identifier is used to access a registered consumer account and obtain a mobile device identifier for the user-operated device 130. The transaction manager 124 also provides the specific item pricing and item description for any item being held by the registered consumer as well as item prices and item descriptions for all items that are currently believed to be in the possession of the registered consumer for purchase. The transaction manager 124 maps the person tracker identifier assigned by the person tracker 122 to the transaction identifier provided by the transaction manager 124 to the person tracker 122 and determines whether the person tracker 122 has identified a registered consumer or not based on an automated check in of the consumer (such as by scanning a bar code on entry to the store or through facial recognition). A profile associated with the registered consumer includes a user-operated device identifier 130 or an identifier for the mobile app 131. The transaction identifier is maintained for the frictionless transaction by the transaction manager.

Assuming the person is a registered consumer with a registered user-operating device 130, the assistance manager 125 dynamically pushes an application message to the operating system (OS) of the user-operated device 130. This forces a wakeup and initiation of the mobile app 131 on the device 130. The assistance manager 125 then provides the item description and item pricing for any item that the registered consumer may be currently holding when the registered consumer is detected as looking at the device 130. The complete item prices, item descriptions, and running transaction price total for all the items are also provided in a message sent from the assistance manager 125 to the mobile app 131.

Upon receipt of the messages, the mobile app 131 presents a user-facing interface on a display of the device 130 to the user and provides within that interface a held item price and held item description along with a running total price for all items in possession of the registered consumer. A link associated with the running total price can be activated by touch in the user-facing interface to display an itemized listing of each item description and each item price associated with the ongoing transaction. When it is determined that the registered consumer is not holding any item at the time that the consumer looked at the device 130, the user-facing interface may present a complete item listing for the ongoing transaction along with the item prices and the running total price. Furthermore, each individual item description may include a link within the user-facing interface that when touched by the registered consumer displays specific item details, such as size, nutritional information, health warnings if any, and any in-store promotions associated with the specific item.

If the person is determined to be looking at a specific inquiry station 140, the assistance manager 125 sends any held item description and pricing and the transaction item descriptions and prices (along with the running price total) to the assistance manager 141 of that inquiry station 142. A similar user-facing interface to that which was described above for the mobile app 131 is provided by the assistance manager 141 on the inquiry station 140.

In an embodiment, the inquiry station 140 may include its own integrated camera 142, such that when the person looks at the inquiry station 140 and is positioned in front of the station 140, the camera 142 captures the image and provides to the pose tracker with an indication that the person is looking at the station 140. The post tracker 123 can then interact with the item tracker 121, person tracker 122, and transaction manager 124 using the image to discover the transaction identifier, person identifier, and any item identifier that is being held by the person. This is provided to the assistance manager 125 or the assistance manager 141 and the user-facing interface that displays any held item description, any held item description, and running transaction price total is presented. Again, the presented information may include touchable links that expand out the running transaction price total to a full listing of all item descriptions and prices in the possession of the person and item details for each listed item description (as was discussed above). It is also to be noted that the person does not have to be registered to receive the frictionless inquiry interface provided as the user-facing interface through the assistance manager 141 on the station 140 because the inquiry station reports a known identifier and a tracked person to a transaction identifier does not have to include a registered consumer to identify how to communicate with the assistance manager 141. The tracked person can in some instances be a registered consumer as was discussed above with the frictionless interface provided as the user-facing interface of the mobile app 131.

The user-facing interface provided by the mobile app 131 and the assistance manager 141 is automatically initiated and activated on device 130 and station 140, without any action of the user taking with respect to the device 130 and station 140. The user-facing interface is automatically placed in a state that shows information assumed to being requested by the user (pricing, descriptions, and details) based on what if anything the user is holding and the current ongoing frictionless transaction being managed by the transaction manager 124.

In an embodiment, the person or registered consumer can pick up an item after looking at the device 130 or the station 140 and the frictionless interface automatically changes from an itemized presentation for all items of the transaction to specific item details for the item that was picked up by the person or registered consumer. In this way, the frictionless interface can be initiated by looking at device 130 or 140 and changed based on an action of the user associated with holding an item. This is done without the user having to touch the user-facing interface or interact directly with any links provided in the user-facing interface.

The system 100 provides a frictionless inquiry interface through the user-facing interfaces of the mobile app 131 and the assistance manager 141. It is frictionless because all the user has to do is look at the device 130 or the station 140 and the user is automatically identified (whether registered or not (as can be the case with the station 140), the transaction is identified, any held item is identified, and a user-facing interface with item details or transaction details is automatically provided through the user-facing interface. All the user has to do is look at the device 130 or station 140 and the user-facing interface is initiated and populated with item and transaction details associated with the user.

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person (unregistered), the person can check out at a transaction terminal, the transaction manager 124 interacts with an agent process on the transaction terminal 140 and provides the shopping cart items for payment when the person tracker 122 identifies the person as being present at the transaction terminal. When the person (identified or unidentified) has a mobile application 131 downloaded to the person's user device 130, the transaction manager interacts with the mobile application to present the items in the shopping cart and obtain payment from the person. Other approaches for checkout may be used as well, where the transaction manager 124 and the person tracker 122 cooperate to obtain payment for known persons (identity known) and for unknown persons (identity unknown).

In an embodiment, the inquiry station 140 is also a transaction terminal from which a user/consumer can checkout and pay for items possessed by the user/consumer. In an embodiment, the transaction terminal is one or more of: A Point-Of-Sale (POS) terminal and a Self-Service Terminal (SST).

In an embodiment, the inquiry station 140 is a digital sign.

In an embodiment, the inquiry station 140 may also include a bar scanner from which consumers can independently scan item barcodes to get item details independent of the frictionless inquiry interface or to independently verify results of the frictionless inquiry interface.

In an embodiment, the inquiry station 140 is a thin client that lacks the assistance manager 141 and the frictionless user interface is provided by the server-based assistance manager 125 on the inquiry station 140.

In an embodiment, the inquiry station 140 lacks any independent camera 142.

In an embodiment, the user-operated device 130 is one or more of: a phone, a tablet, a laptop, and a wearable processing device.

These embodiments and other embodiments are now discussed with reference to the FIGS. 2-4.

Figure 2:
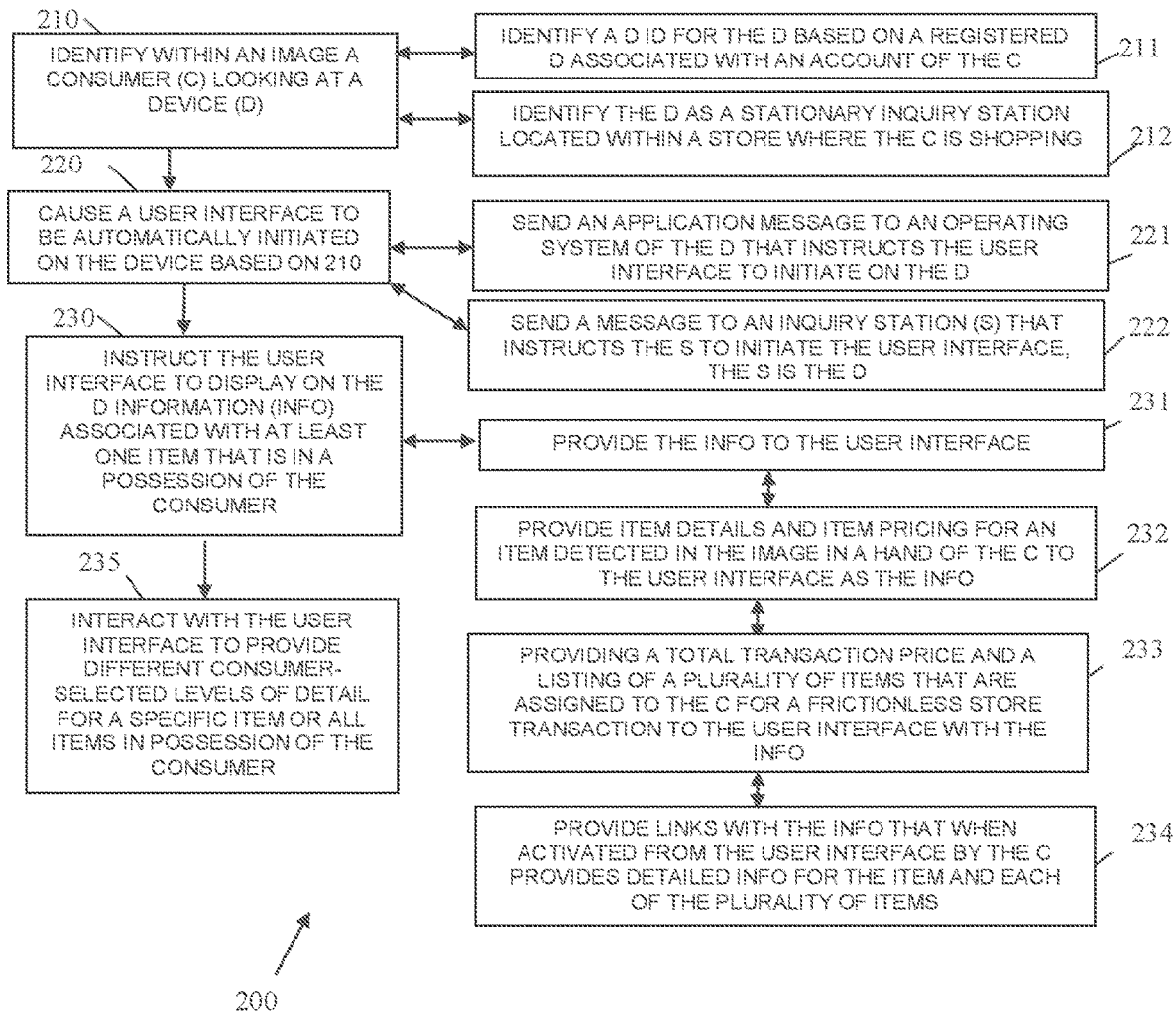
FIG. 2 is a diagram of a method for frictionless inquiry processing, according to an example embodiment.

FIG. 2 is a diagram of a method 200 for frictionless inquiry processing, according to an example embodiment. The software module(s) that implements the method 200 is referred to as a "frictionless inquiry monitor." The frictionless inquiry monitor is implemented as executable instructions programmed and residing within memory and/or a non-transitory computer-readable (processor-readable) storage medium and executed by one or more processors of a device. The processor(s) of the device that executes the frictionless inquiry monitor are specifically configured and programmed to process the frictionless inquiry monitor. The frictionless inquiry monitor has access to one or more network connections during its processing. The network connections can be wired, wireless, or a combination of wired and wireless.

In an embodiment, the device that executes the frictionless inquiry monitor is the server 120. In an embodiment, the server 120 is a cloud-based server.

In an embodiment, the frictionless inquiry monitor is all or some combination of: the item tracker 121, the person tracker 122, the pose tracker 123, the assistance manager 125, and/or the assistance manager 141.

At 210, the frictionless inquiry monitor identifies within an image a consumer looking at a device. This can be done through any of the mechanisms discussed above with the FIG. 1 including the person tracker 122 and the pose tracker 123 and/or including a trained machine-learning algorithm.

In an embodiment, at 211, the frictionless inquiry monitor identifies a device identifier for the device based on a registered device associated with an account of the consumer. That is, a consumer identifier that is used to track the consumer is linked to the account and the account includes a consumer profile having the device identifier.

In an embodiment, at 212, the frictionless inquiry monitor identifies the device as a stationary inquiry station 140 located within a store where the consumer is shopping. The images include metadata that identifies the physical locations represented in the images and the stationary inquiry station includes a known physical location that is associated with the images.

At 220, the frictionless inquiry monitor causes a user interface to be automatically initiated on the device based on identifying the consumer looking at the device as discussed at 210.

In an embodiment, at 221, the frictionless inquiry monitor sends an application message to an Operating System (OS) of the device that instruction the user interface to be automatically initiated on the device. In an embodiment, the user may select a confirmation button that pops up on the device before the user interface is initiated. In an embodiment, the user interface is the user-facing or frictionless interface associated with the mobile application 131 as discussed above with the FIG. 1 and the system 100.

In an embodiment, at 222, the frictionless inquiry monitor sends a message to an inquiry station 140 that instructs the inquiry station 140 to automatically initiate the user interface. Here, the device is the inquiry station 140.

At 230, the frictionless inquiry monitor instructs the user interface to display on the device information associated with at least one item that is in a possession of the consumer based on processing the image or previous images captured for the consumer.

In an embodiment, at 231, the frictionless inquiry monitor provides the information to the user interface.

In an embodiment of 231 and at 232, the frictionless inquiry monitor provides item details and item pricing for an item detected in the image that is in a hand of the consumer as the information.

In an embodiment of 232 at 233, the frictionless inquiry monitor provides a total transaction price and a listing of a plurality of items that are assigned to the consumer for a frictionless store transaction to the user interface with the information.

In an embodiment of 233 at 234, the frictionless inquiry monitor provides links with the information that when activated from the user interface by the consumer provides detailed information for the item and each of the plurality of items.

In an embodiment, at 235, the frictionless inquiry monitor interacts with the user interface to provide different consumer-selected levels of detail for a specific item or all items that are in the possession of the consumer.

Figure 3:
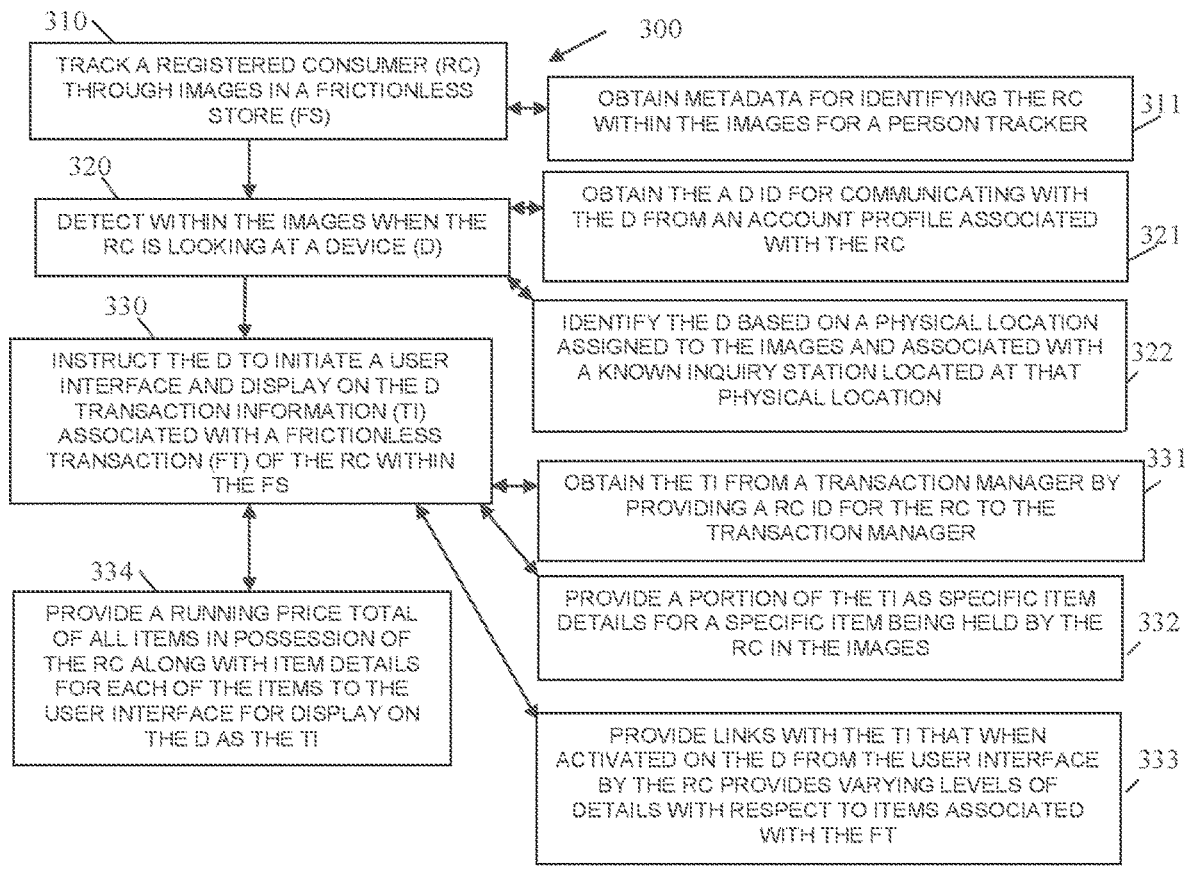
FIG. 3 is a diagram of another method for frictionless inquiry processing, according to an example embodiment.

FIG. 3 is a diagram of another method 300 for frictionless inquiry processing, according to an example embodiment. The software module(s) that implements the method 300 is referred to as an "automated inquiry service." The automated inquiry service is implemented as executable instructions programmed and residing within memory and/or a non-transitory computer-readable (processor-readable) storage medium and executed by one or more processors of a device. The processors that execute the automated inquiry service are specifically configured and programmed to process the automated inquiry service. The automated inquiry service has access to one or more network connections during its processing. The network connections can be wired, wireless, or a combination of wired and wireless.

In an embodiment, the device that executes the automated inquiry service is the server 120. In an embodiment, the server 120 is a cloud processing environment.

In an embodiment, the device that executes the automated inquiry service is the station 140.

In an embodiment, the automated inquiry service is all of or some combination of: the item tracker 121, the person tracker 122, the pose/tracker 123, the assistance manager 125, the assistance manager 141, and/or the method 200.

The automated inquiry service presents another and in some ways enhanced processing perspective of the method 200 discussed above.

At 310, the automated inquiry service tracks a registered consumer through images in a frictionless store.

In an embodiment, at 311, the automated inquiry service obtains metadata for identifying the registered consumer within the images from a person tracker 122.

At 320, the automated inquiry service detects within the images when the registered consumer is looking at a device.

In an embodiment, at 321, the automated inquiry service obtains a device identifier for communicating with the device from an account profile associated with the registered consumer.

In an embodiment, at 322, the automated inquiry service identifies the device based on a physical location assigned to the images and associated with a known inquiry station 140 located at that physical location.

At 330, the automated inquiry service instructs the device to initiate a user interface and display on the device transaction information associated with a frictionless transaction of the registered consumer within the frictionless store.

In an embodiment, at 331, the automated inquiry service obtains the transaction information from a transaction manager 124 by providing a registered consumer identifier for the registered consumer to the transaction manager 124.

In an embodiment, at 332, the automated inquiry service provides a portion of the transaction information as specific item details for a specific item being held by the registered consumer in the images.

In an embodiment, at 333, the automated inquiry service provides links with the transaction information that when activated on the device from the user interface by the registered consumer provides varying levels of details with respect to items associated with the frictionless transaction.

In an embodiment, at 334, the automated inquiry service provides a running total price of all items along with item detail for each of the items to the user interface for display on the device as the transaction information.

Figure 4:
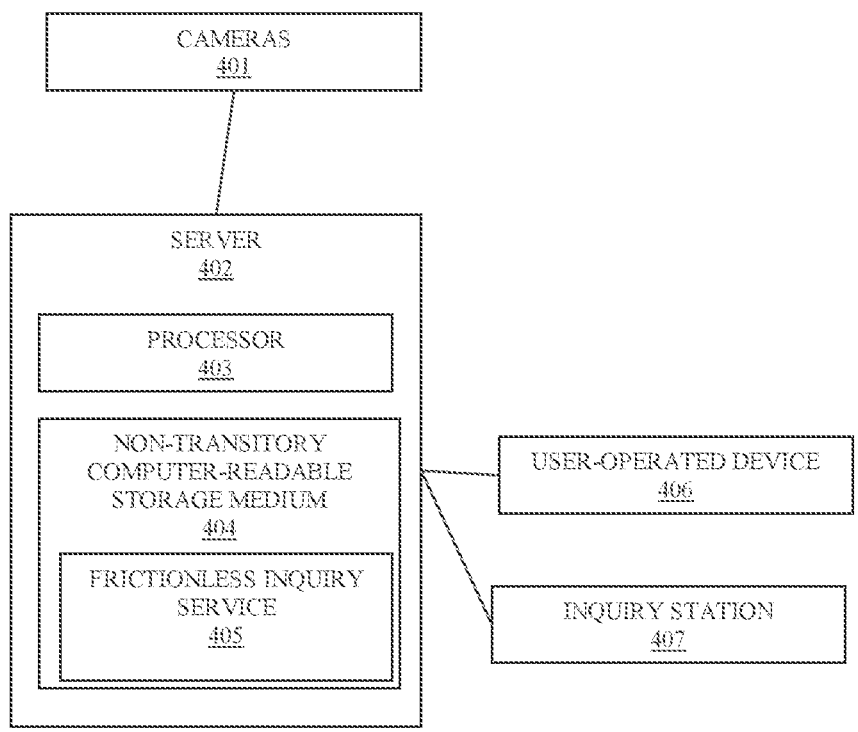
FIG. 4 is a diagram of a system for frictionless inquiry processing, according to an example embodiment.

FIG. 4 is a diagram of a system 400 for frictionless inquiry processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality of cameras 401, a server 402, a user-operated device 406, and an inquiry station 407. The server 402 includes at least one hardware processor 403 and configured to execute executable instructions from a non-transitory computer-readable storage medium 404 as frictionless inquiry service 405.

The frictionless inquiry service 405 when executed from the non-transitory computer-readable storage medium 404 on the processor 403 is configured to cause the processor to: identify when a shopper that is shopping in the frictionless store is looking at the user-operated device 406 from the images; cause a user interface to automatically initiate on the user-operated device 406 and display transaction information associated with a transaction of the shopper; identify when the shopper is looking at or in front of the inquiry station 407 based at least in part on the images; and cause a second user interface to automatically initiate on the inquiry station 407 and display the transaction information associated with the transaction of the shopper.

In an embodiment, the frictionless inquiry service 405 when executed from the non-transitory computer-readable storage medium 404 on the processor 403 is further configured to cause the processor to: provide the transaction information with links that when activated by the shopper from the user interface or the second user interface presents shopper-controlled details for items associated with the transaction.

In an embodiment, the frictionless inquiry service 405 is all or some combination of the: image tracker 121, the person tracker 122, the pose tracker 123, the transaction manager 124, the assistance manager 125, the method 200, and/or the method 300.

In an embodiment, the server 402 is a cloud-based processing environment.

In an embodiment, the user-operated device 406 is: a mobile phone, a tablet, or a wearable processing device (such as a smart watch).

In an embodiment, the inquiry station 407 is: a POS terminal, a SST, a digital sign, or a thin client display.

In an embodiment, the system 400 is deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1. The frictionless store may be associated with or included within a traditional store as discussed above. That is, a traditional store can be equipped with the system 400 in all or a portion of the traditional store that includes POS terminals and SSTs.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a server from a non-transitory computer-readable storage medium causing the processor to perform operations comprising:
tracking a registered consumer through images in a frictionless store by identifying and tracking the registered consumer and any items that the registered consumer is in possession of or is holding within the frictionless store through the images using identifiers for the registered consumer and the items, wherein tracking further includes obtaining the images from cameras situated throughout locations of the frictionless store;

tracking poses of the registered consumer and identifying non-item objects that the registered consumer is looking at within the images;

detecting based on the tracking of the poses when the registered consumer is looking at a device identified as any of a mobile device of the registered consumer, a transaction terminal, a digital sign, a tablet, a watch and an inquiry station; and instructing the device to initiate a user interface and display on the device transaction information associated with a frictionless transaction being managed on behalf of the registered consumer within the frictionless store from the images, wherein the transaction information associated with one or all of the items in possession of or being held by the consumer based on the tracking of the registered consumer.

2. The method of claim 1, wherein tracking the registered consumer further includes obtaining metadata for identifying the registered consumer within the images from a person tracker.

3. The method of claim 1, wherein detecting further includes obtaining a device identifier for communicating with the device from an account profile associated with the registered consumer.

4. The method of claim 1, wherein detecting further includes identifying the device based on a physical location assigned to the images and associated with a known inquiry station located at that physical location.

5. The method of claim 1, wherein instructing further includes obtaining the transaction information from a transaction manager by providing a registered consumer identifier for the registered consumer to the transaction manager.

6. The method of claim 1, wherein instructing further includes providing a portion of the transaction information as specific item details for a specific item being held by the registered consumer in the images.

7. The method of claim 1, wherein instructing further includes providing links with the transaction information that when activated on the device from the user interface by the registered consumer provides individual specific item details for each item associated with the frictionless transaction.

8. The method of claim 1, wherein instructing further includes providing a running price total of all of the items in possession of the registered consumer along with item details for each of the items to the user interface for display on the device as the transaction information.

* * * * *